April 8, 1958  C. G. DE BLASIO  2,830,255
ALTERNATING CURRENT REGULATOR
Filed Sept. 8, 1955  2 Sheets-Sheet 1

INVENTOR.
Conrad G. DeBlasio
BY
ATTORNEY

April 8, 1958 C. G. DE BLASIO 2,830,255
ALTERNATING CURRENT REGULATOR
Filed Sept. 8, 1955 2 Sheets-Sheet 2
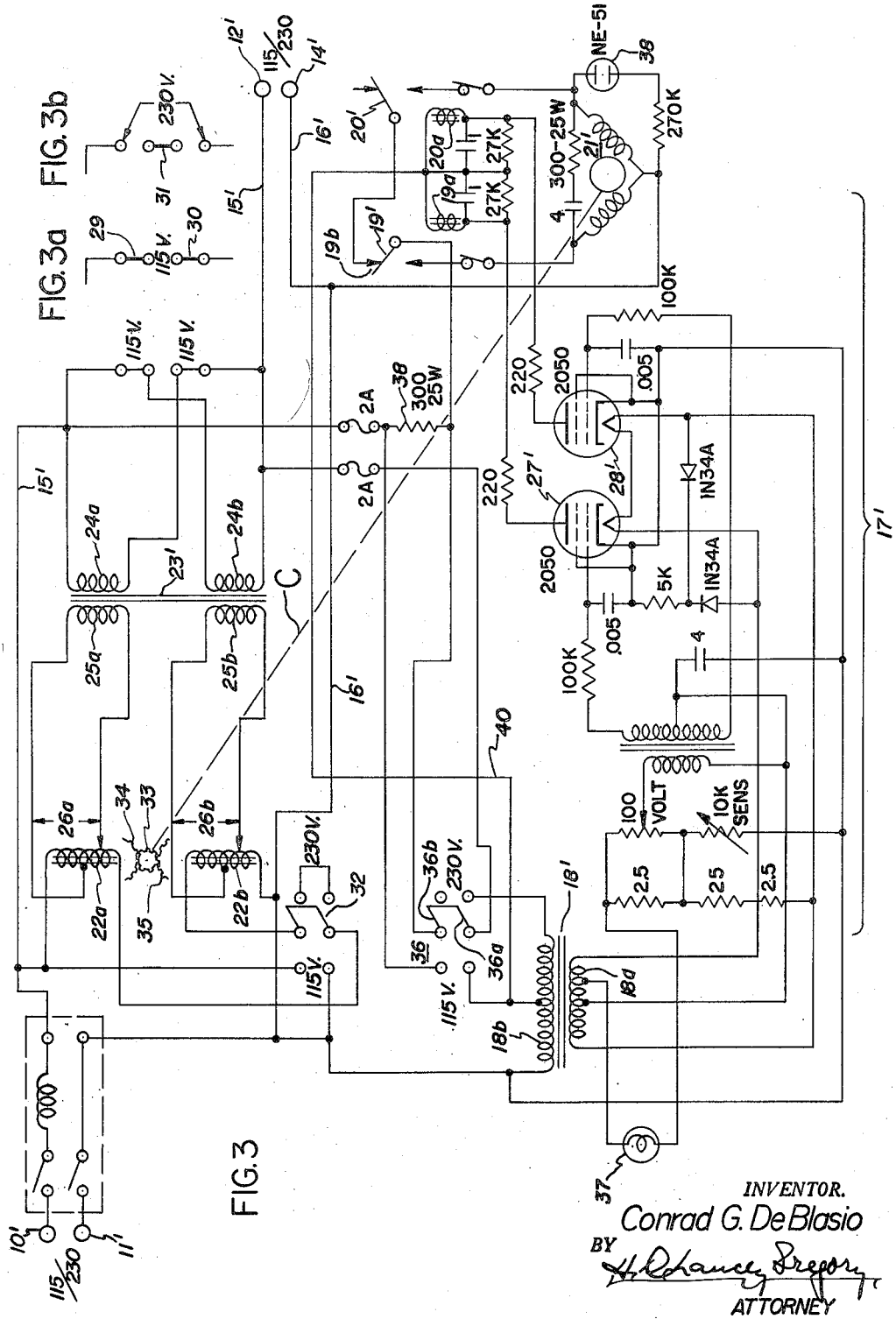
INVENTOR.
Conrad G. De Blasio
BY
ATTORNEY

United States Patent Office 2,830,255
Patented Apr. 8, 1958

2,830,255

ALTERNATING CURRENT REGULATOR

Conrad G. De Blasio, Middletown, N. J.

Application September 8, 1955, Serial No. 533,084

5 Claims. (Cl. 323—45)

My invention relates to improvements in alternating current regulators, and more particularly to those which on occasion might be plugged into an alternating current outlet and employed to regulate or to maintain a voltage other than the specific voltage for which such regulators were designed.

The disadvantage of the aforesaid regulators resides in the fact that should they, for example, be rated at or designed to handle two hundred thirty volts but used, regardless of this, to regulate at the 115-volt level, the total power rating of the unit would be substantially reduced.

With the foregoing in mind, it is one of the objects of my invention to provide an improved dual or multi-voltage alternating current regulator which can be set or adjusted to function efficiently at each of two widely separated voltage levels, i. e., to operate at either voltage level without any undesirable decrease in power rating.

Other objects and advantages will hereinafter appear.

For the purpose of illustrating my invention, an embodiment thereof is shown in the drawings, wherein:

Fig. 3 is a diagrammatic view of a dual-voltage alternating current regulator constructed and operating in accordance with my invention;

Figs. 3a and 3b are schematic views related to and illustrative of a switching or changeover operation in Fig. 3.

Figure 1:
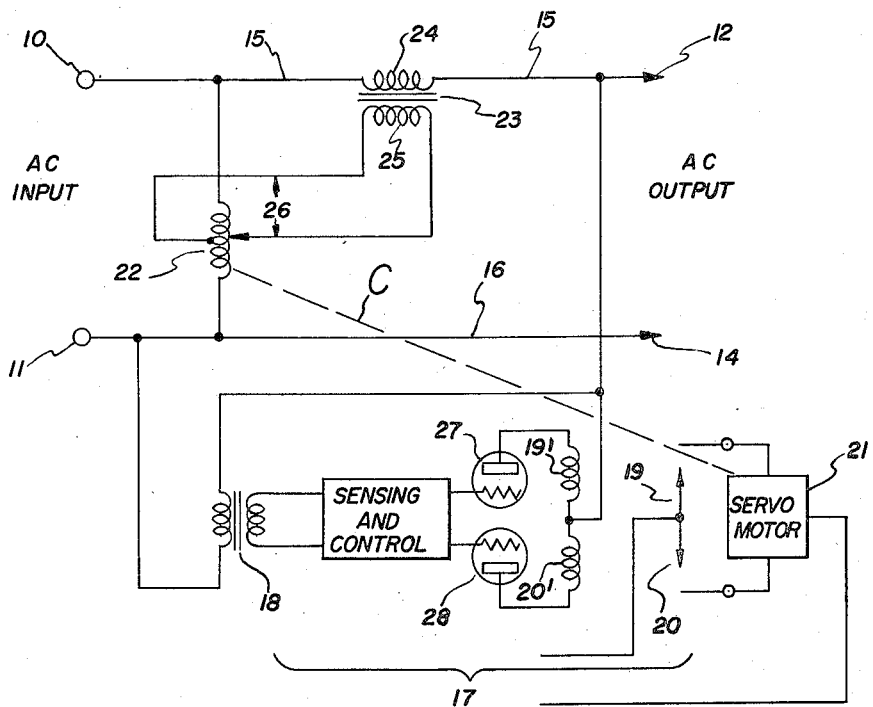
Fig. 1 is a simplified diagrammatic view of a prior-art form or type of alternating current regulator referred to above.

The prior-art regulator or system shown in Fig. 1 comprises, basically, a pair of input terminals 10 and 11 for application of a specific alternating-current voltage to the regulator, a pair of output terminals 12 and 14 for connection of load to the regulator, a first main line 15 from input terminal 10 to output terminal 12, a second main line 16 connecting input terminal 11 to output terminal 14; a voltage-sensing and control system 17 responsive through a transformer 18 to fluctuations in the output or load voltage across terminals 12 and 14 and effective upon such fluctuations in either direction to activate one or the other of two, associated relays 19 and 20; and a servomotor 21 for rotating a variable auto-transformer or so-called "Variac" 22 through a suitable mechanical connection represented by the broken line C. The voltage-regulating action is accomplished or brought about according to the direction in which auto-transformer 22 is rotated. Such rotation causes insertion in line 15, through a buck-boost transformer 23 having its secondary 24 connected in line 15 and its primary 25 connected to the secondary winding 26 of auto-transformer 22, of either an aiding or an opposing voltage to compensate for fluctuations in voltage across the input terminals 10 and 11 and to maintain substantially constant the output or load voltage across terminals 12 and 14. Forming part of the voltage-sensing and control system 17 are two thyratrons represented at 27 and 28 and biased beyond cut-off. In operation, should the output or load voltage increase above the desired level, thyratron 27 fires to activate the coil 19' of relay 19 whereupon motor 21 rotates auto-transformer 22 in the proper direction to insert in line 15 an opposing, compensating voltage. Conversely, should the output or load voltage decrease below the desired level, thyratron 28 fires to activate the coil 20' of relay 20 whereupon motor 21 rotates auto-transformer 22 in the opposite direction to insert in line 15 an aiding, compensating voltage. For the sake of simplicity, in Fig. 1 only the plates and the biasing grids of thyratrons 27 and 28 have been shown.

Figure 2:
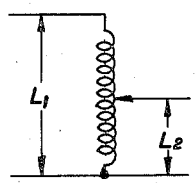
Fig. 2 is a simplified, schematic view of an auto-transformer and is illustrative of the operating deficiency of the type or design of alternating current regulator used heretofore, as in Fig. 1.

The auto-transformer 22 can be considered as having two useful windings, i. e., the primary winding connected across lines 15 and 16, and a secondary winding 26. The amount of current that can be carried by any given transformer is limited by the gauge of the wire. It will be assumed that the transformer in Fig. 2 is rated at 230 volts, that it can supply useful current up to 25 amperes, and that it is substituted for and used in place of the auto-transformer 22 in Fig. 1. Should the regulator in Fig. 1 now be used to regulate at the 115-volt level, there are the following conditions or changes which must be considered if there is to remain the same power rating as at the 230-volt level.

Among other things, the primary and secondary windings of the buck-boost transformer 23 must be of substantially larger wire gauge to be commensurate for the higher current required to obtain the same power rating.

The auto-transformer 22 is still limited, by the gauge or size of the wire, to carry no more than 25 amperes.

The voltage-sensing and control system 17 and servomotor 21 must be made to conform to the electrical requirements for operation at the 115-volt level.

From the foregoing it will be seen that the total power rating of the regulator would be substantially reduced because some of the components designed or adjusted for 230-volt operation could not accommodate the current differences necessary to maintain the same rating for 115-volt operation. Furthermore, the respective resistance, capacitance and other values or requirements, important for efficient operation of the voltage-sensing and control 17 and of servomotor 21, would be incommensurate.

A type of A. C. voltage regulator in the same general class and having limitations similar to those of the regulator shown in Fig. 1 and described above, is disclosed in detail in Patent No. 2,504,017, issued April 11, 1950, to Nils N. George et al.

In Fig. 3 the various components or units which correspond to and serve the same purpose, respectively, as those in Fig. 1, are designated by the same respective reference numerals as the latter. A pair of input terminals 10' and 11' provides, for example, for application of alternating current at either the 115-volt level or the 230-volt level. The load is connected to a pair of output terminals 12' and 14'. The input terminal 10' and the output terminal 12' are connected by a first main line 15'. The input terminal 11' and the output terminal 14' are connected by a second main line 16'.

A bifilarly-wound transformer 23' comprises the two primary windings 25a and 25b and the two secondary windings 24a and 24b inductively associated respectively with windings 25a and 25b. As shown in Figs. 3a and 3b, links 29, 30 and 31 provide means for connecting the secondary windings 24a and 24b in the first main line 15', in parallel or series relation selectively with respect to each other.

Two variable auto-transformers or "Variacs" 22a and 22b have their secondary windings 26a and 26b connected respectively to the primary windings 25a and 25b of transformer 23'. A double-pole, double-throw switch 32 provides means for selectively connecting the primary windings of auto-transformers 22a and 22b across input terminals 10' and 11' and selectively in parallel or series relation with respect to each other.

Figure 4:
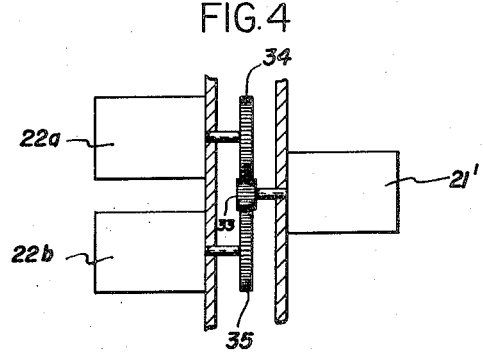
Fig. 4 is a simplified, plan view showing the manner in which the servomotor in Fig. 3 is arranged and geared to drive the two auto-transformers.

A synchronous motor 21' of the multi-pole type functions as a servomotor and is automatically controlled to rotate auto-transformers 22a and 22b through a suitable mechanical connection represented in Fig. 3 by the broken line C. The auto-transformers 22a and 22b and servomotor 21' may be arranged and supported as shown in Fig. 4, the former being adjacent to each other and their respective drive shafts being disposed in parallel relation. Servomotor 21' is intermediate the auto-transformers 22a and 22b, and a pinion 33 fixed on the rotor or armature shaft of the motor is in mesh with gears 34 and 35 fixed respectively to the drive shafts of the auto-transformers.

A voltage-sensing and control system 17' is responsive through a transformer 18' to fluctuations in the output or load voltage across terminals 12' and 14', and is effective upon such fluctuations in either direction to activate one or the other of two, associated relays 19' and 20'.

The voltage-regulating action is accomplished or brought about according to the direction in which auto-transformers 22a and 22b are rotated. Such rotation causes insertion in line 15', through the buck-boost transformer 23', of either an aiding or an opposing voltage to compensate for fluctuations in voltage across input terminals 10' and 11' and to maintain substantially constant the output or load voltage across terminals 12' and 14'.

Forming part of the voltage-sensing and control system 17' are two thyratrons represented at 27' and 28' and biased beyond cut-off. In operation, should the output or load voltage increase above the desired level, thyratron 27' fires to activate the coil 19a of relay 19' whereupon motor 21' rotates auto-transformers 22a and 22b in the proper direction to insert in line 15' an opposing, compensating voltage. Conversely, should the output or load voltage decrease below the desired level, thyratron 28' fires to activate the coil 20a of relay 20' whereupon motor 21' rotates auto-transformers 22a and 22b in the opposite direction to insert in line 15' an aiding, compensating voltage. In either case, when the point is reached whereat the voltage level is normal again, that one of the relays 19' and 20' which has been activated is deenergized and, being spring-biased to open position, cuts off the supply to motor 21'.

For the voltage-regulator tube or voltage-sensing element of the control system 17', there may be employed a tungsten-filament lamp 37. Lamp 37 is connected as shown, to the secondary winding 18a of transformer 18'. The primary winding 18b of transformer 18' is tapped and connected to a switch 36 so that the blade 36a of the latter can connect winding 18b for operation of the regulator at either the 115-volt level or at the 230-volt level. The primary winding 18b serves as an auto-transformer, thereby to provide substantially constant voltage to the thyratron and relay circuits by way of the connection 40. Otherwise, the circuits would be unduly affected by the substantially great difference in level of voltage operation such as, for example, from 115 volts to 230 volts.

The bridge circuit or arrangement shown in Fig. 3 for system 17' is a well known expedient or technique, and no claim to the same per se is made herein. Representative values of resistance and capacitance which have given satisfactory results, are given in Fig. 3. Capacitance is given in microfarads and where otherwise specified, resistance is given in ohms, 1 watt. K is the factor 1,000. For the thyratrons 27' and 28', those identified in the trade as No. 2050's, may be used.

The secondary windings 24a and 24b of the buck-boost, bifilarly-wound transformer 23', are designed so that they can be connected in parallel without unbalance currents. From an energy standpoint, the variable auto-transformers 22a and 22b connected to the primary windings 25a and 25b, are effectively working in parallel. Furthermore, the leakage reactance of transformer 23', together with the commutating action of the individual auto-transformer brushes, serves as an effective overall commutating means avoiding damage from unbalance currents during operation of the regulator. The variable auto-transformers 22a and 22b are phased so as to make such currents minimal.

During operation of the regulator at the 230-volt level, a resistor 38 is effective and connected between line 15' and motor 21'. During operation at the 115-volt level, the blade 36b of switch 36 shorts out resistor 38.

In the operation of my improved regulator at the 115-volt level, each of the switches 32 and 36 is closed to the left, and links 29 and 30 are placed in position as shown in Fig. 3a. For the 230-volt operation, each of the switches 32 and 36 is closed to the right, and link 31 is placed in position as shown in Fig. 3b.

By mating gears 34 and 35 to the point whereat constant contact is effected, unbalance due to back-lash is eliminated.

A neon lamp 38 is connected as shown in Fig. 3 to flash or light up when relay 20' is in the down or closed position and relay 19' is in the up position shown. This provides a safety feature to give a visual signal should relay 20' stick or otherwise remain in the down or closed position thereof after the voltage has been raised or restored to the desired level. In such event, as soon as the voltage becomes excessive on account of relay 20' being stuck or otherwise remaining in the closed position thereof although its coil 20a is not energized, relay 19' responds and its armature is pulled to the down position to break the contact at 19b thereby to cause lamp 38 to go out. Following the seconds or the fraction of a second it takes for the voltage to be restored, relay 19' becomes deenergized and connection is again made at 19b. This causes lamp 38 to flash or light up again, since relay 20' is still stuck in the down position thereof. Such cycle or action will be repeated continuously under the conditions assumed, and the regulator will hunt. Lamp 38 will keep flashing on and off at every closing and opening of the contact at 19b. In this way there is given a flashing or on-and-off visual signal to warn that the voltage-increase relay 20' is stuck in the closed position thereof. The safety action just explained effectively prevents the defective relay 20' from causing damage to the load due to application thereto of excessively high voltage.

Although but one embodiment of my invention has been disclosed herein, it will be understood that modifications within the conception of those skilled in the art are possible without departing from the spirit of my invention or the scope of the claims.

I claim as my invention:

1. In an alternating current regulator of the character described, a pair of input terminals for application of at least two different alternating-current voltages to said regulator, a pair of output terminals for connection of load to said regulator, a first main line from one of said input terminals to one of said output terminals, a second main line connecting the other of said input terminals to the other of said output terminals, a transformer having a plurality of primary windings and the same number of secondary windings inductively associated respectively with said primary windings, means for selectively connecting said secondary windings in said first main line in parallel or series relation with respect to each other, a plurality of variable auto-transformers having the secondary windings thereof connected respectively to said primary windings, means for connecting the primary windings of said auto-transformers across said input terminals and selectively in parallel or series relation with respect to each other, a servomotor common to said auto-transformers and connected thereto to drive the same, and means responsive to fluctuations in voltage across said output terminals and effective thereupon to initiate operation of said motor in one direction or the other.

2. In an alternating current regulator of the character described, a pair of input terminals for application of at least two different alternating-current voltages to said regulator, a pair of output terminals for connection of load to said regulator, a first main line from one of said input terminals to one of said output terminals, a second main line connecting the other of said input terminals to the other of said output terminals, a transformer having two primary windings and two secondary windings inductively associated respectively with said primary windings, means for selectively connecting said secondary windings in said first main line in parallel or series relation with respect to each other, two variable auto-transformers supported adjacent to each other and with their respective drive shafts disposed in substantially parallel relation, gears fixed respectively to said shafts, the secondary windings of said auto-transformers being connected respectively to said primary windings, means for selectively connecting the primary windings of said auto-transformers across said input terminals and selectively in parallel or series relation with respect to each other, a servomotor common to said auto-transformers, a pinion fixed on the shaft of said motor and in mesh with said gears, and means responsive to fluctuations in voltage across said output terminals and effective thereupon to initiate operation of said motor in one direction or the other.

3. In an alternating current regulator of the character described, a pair of input terminals for application of at least two different alternating-current voltages to said regulator, a pair of output terminals for connection of load to said regulator, a first main line from one of said input terminals to one of said output terminals, a second main line connecting the other of said input terminals to the other of said output terminals, a transformer having a plurality of primary windings and the same number of secondary windings inductively associated respectively with said primary windings, means for selectively connecting said secondary windings in said first main line in parallel or series relation with respect to each other, a plurality of variable auto-transformers having their secondary windings connected respectively to said primary windings, means for selectively connecting the primary windings of said auto-transformers across said input terminals and selectively in parallel or series relation with respect to each other, a servomotor common to said auto-transformers and connected to drive the same, means responsive to fluctuations in voltage across said output terminals and effective thereupon to initiate operation of said motor in one direction or the other; said last-named means including a transformer having a secondary winding and a tapped primary winding functioning as an auto-transformer, and means for connecting said tapped primary winding across said output terminals for operation of said last-named transformer selectively at different ratios, said third-named means being connected to said last-named secondary winding; a resistor connected between said motor and one of said main lines, and means for shorting said resistor.

4. In an alternating current regulator of the character described, a pair of input terminals for application of at least two different alternating-current voltages to said regulator, a pair of output terminals for connection of load to said regulator, a first main line from one of said input terminals to one of said output terminals, a second main line connecting the other of said input terminals to the other of said output terminals, a bifilarly-wound transformer having a plurality of primary windings and the same number of secondary windings inductively associated respectively with said primary windings, means for selectively connecting said secondary windings in said first main line in parallel or series relation with respect to each other, a plurality of variable auto-transformers having the secondary windings thereof connected respectively to said primary windings, means for connecting the primary windings of said auto-transformers across said input terminals and selectively in parallel or series relation with respect to each other, a servomotor common to said auto-transformers and connected thereto to drive the same, and means responsive to fluctuations in voltage across said output terminals and effective thereupon to initiate operation of said motor in one direction or the other.

5. In an alternating current regulator of the character described, a pair of input terminals for application of at least two different alternating-current voltages to said regulator, a pair of output terminals for connection of load to said regulator, a first main line from one of said input terminals to one of said output terminals, a second main line connecting the other of said input terminals to the other of said output terminals, a transformer having a plurality of primary windings and the same number of secondary windings inductively associated respectively with said primary windings, means for selectively connecting said secondary windings in said first main line in parallel or series relation with respect to each other, a plurality of variable auto-transformers having the secondary windings thereof connected respectively to said primary windings, means for connecting the primary windings of said auto-transformers across said input terminals and selectively in parallel or series relation with respect to each other, a servomotor common to said auto-transformers and connected thereto to drive the same, means responsive to fluctuations in voltage across said input terminals and effective thereupon to initiate operation of said motor in one direction or the other, a transformer having a secondary winding and a tapped primary winding connected to function as an auto-transformer, a connection from an intermediate point on said tapped primary winding to said third-named means, and means connecting said last-named secondary winding to said third-named means.

References Cited in the file of this patent

UNITED STATES PATENTS 2,623,608     Hall     Dec. 30, 1952

FOREIGN PATENTS 409,128     Great Britain     Apr. 26, 1934